United States Patent [19]
Dohan et al.

[11] Patent Number: 5,591,040
[45] Date of Patent: Jan. 7, 1997

[54] FLOATING CONNECTOR WITH TEMPORARY LOCKING FACILITY AND SPACE APPLICATION THEREOF

[75] Inventors: Yves Dohan, Paris; Maurice Rouhier, Viroflay; Jacques-Henry Heulot, Cergy, all of France

[73] Assignee: Framatome Connectors International, Paris, France

[21] Appl. No.: 390,924

[22] Filed: Feb. 16, 1995

[30] Foreign Application Priority Data

Feb. 16, 1994 [FR] France ................... 94 01744

[51] Int. Cl.⁶ ............................... H01R 13/629
[52] U.S. Cl. ............................................. 439/248
[58] Field of Search ........................ 439/246–248, 439/252

[56] References Cited

FOREIGN PATENT DOCUMENTS

| 371835 | 6/1990 | France . |
| 3903839 | 8/1989 | Germany . |
| 406013131 | 1/1994 | Japan ................... 439/246 |

*Primary Examiner*—Gary F. Paumen
*Attorney, Agent, or Firm*—Pollock, Vande Sande & Priddy

[57] ABSTRACT

A temporary locking device for locking the base of a floating base type connector comprises a pair of jaws, each actuated by a control member. The latter comprises a pedal operating through the intermediary of a finger on a drive piston having two notches defining locked and unlocked stable positions of the jaws. The finger operates also on a cam whose head engages in the notches. The device also comprises a manual resetting knurled wheel. Applications include space applications.

8 Claims, 4 Drawing Sheets

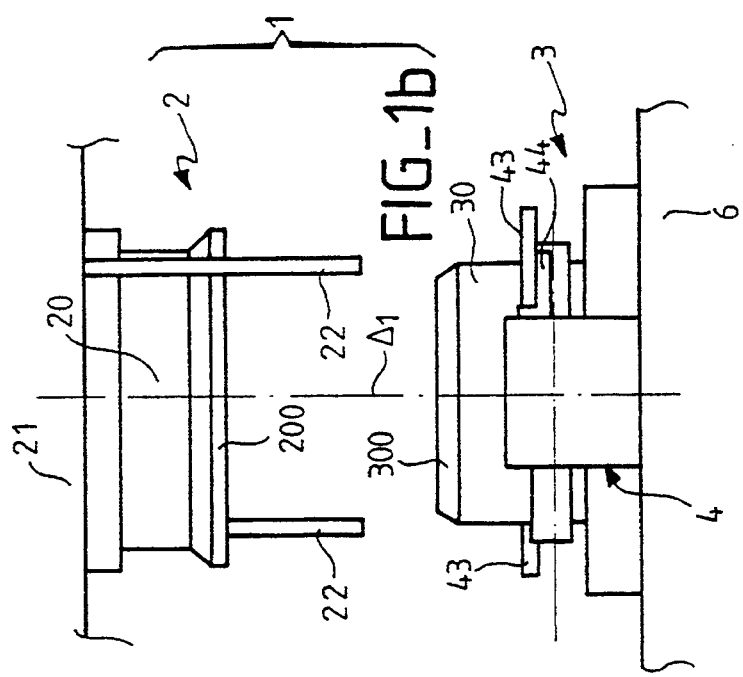
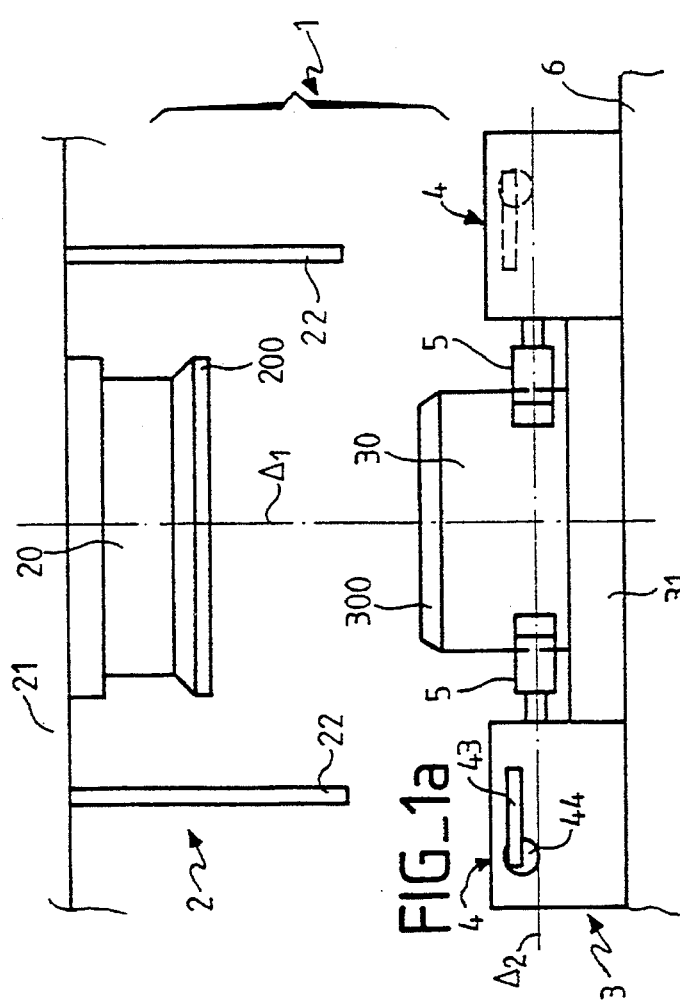
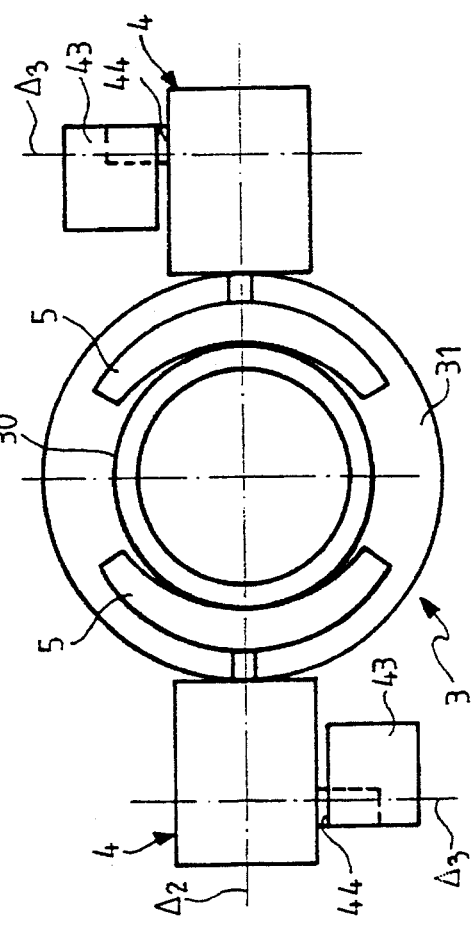

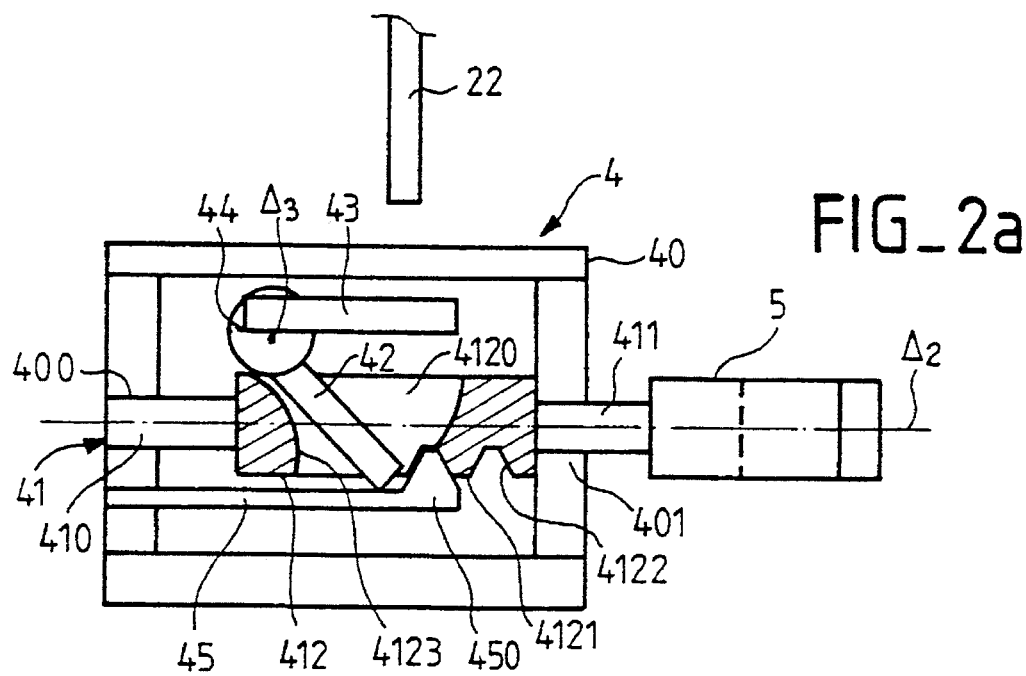
FIG_2a
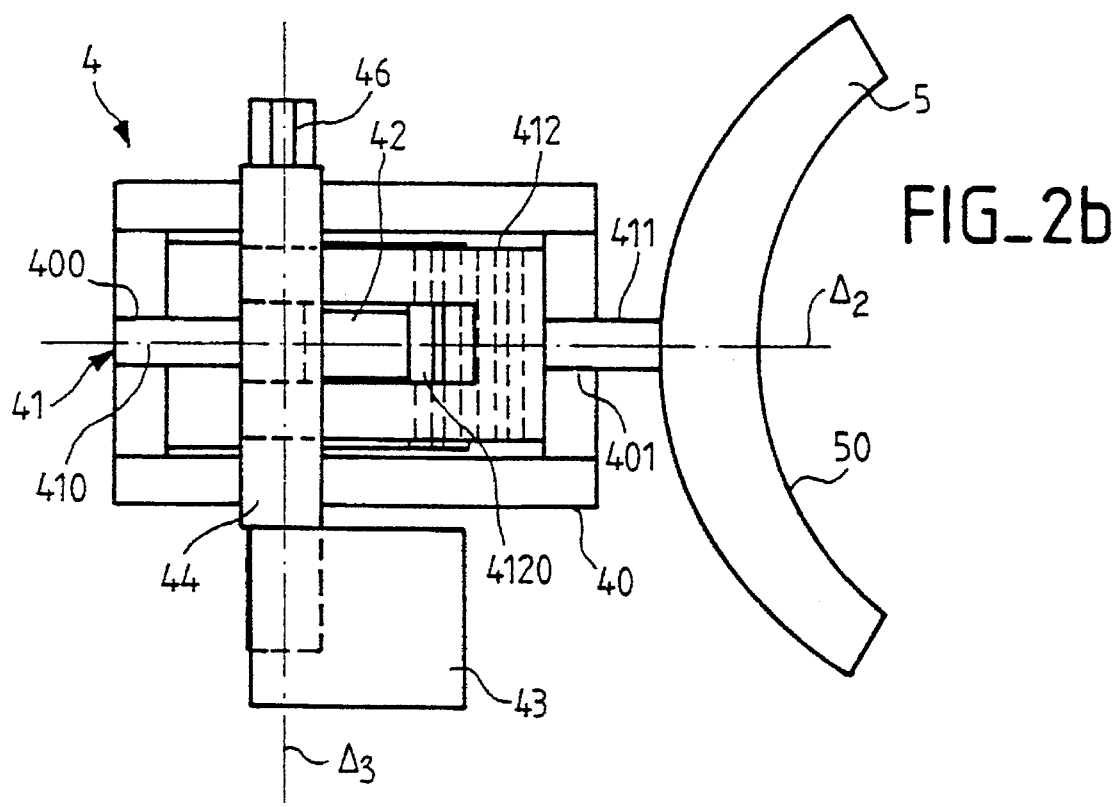
FIG_2b

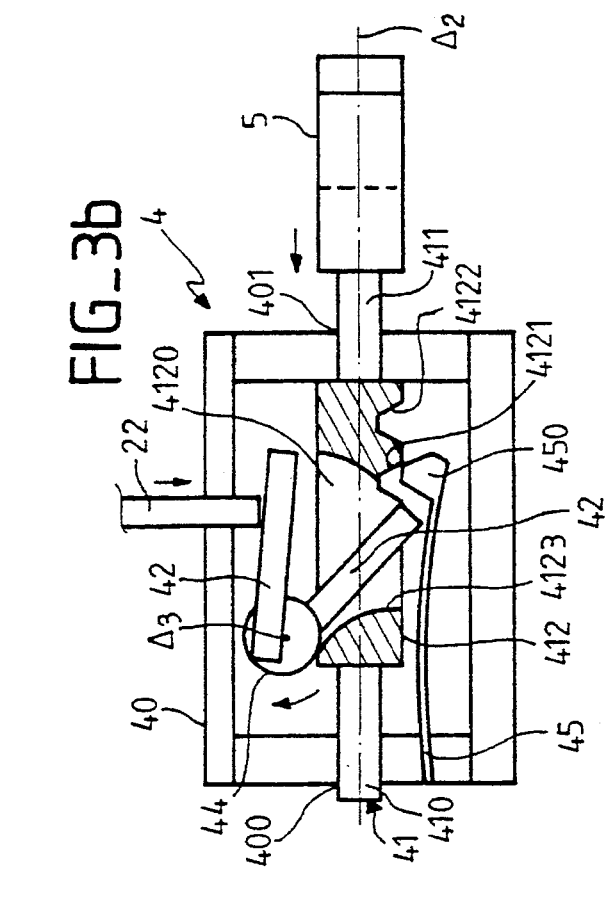
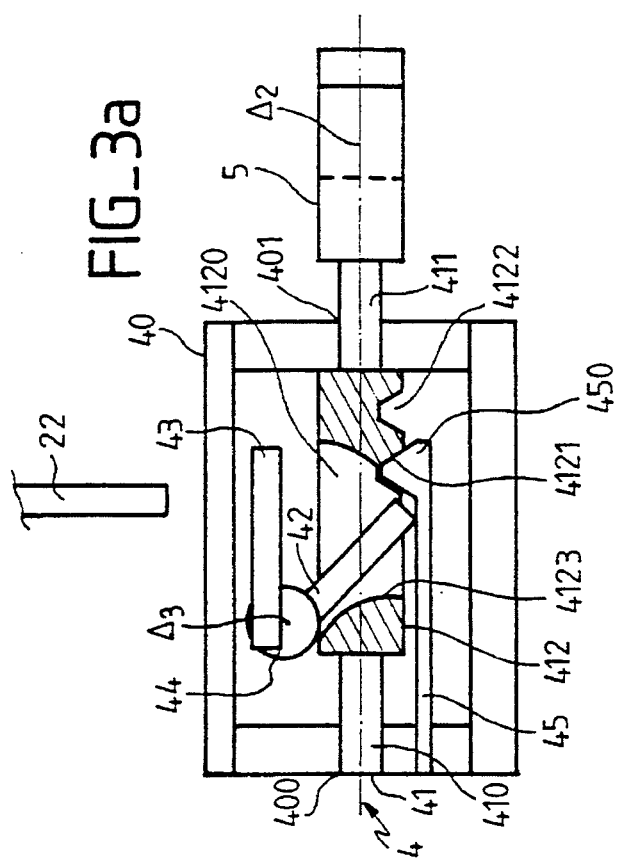
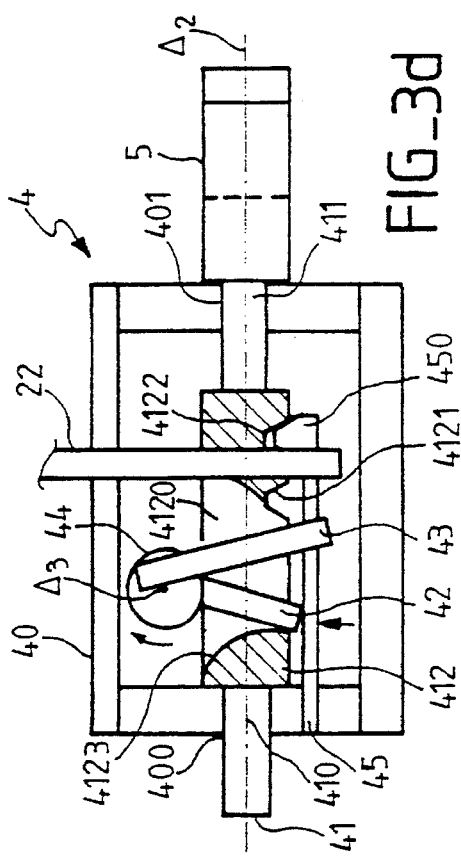
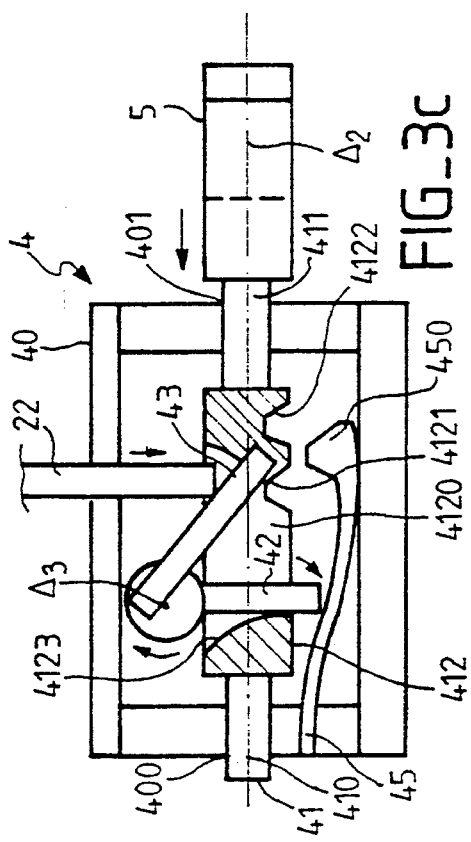

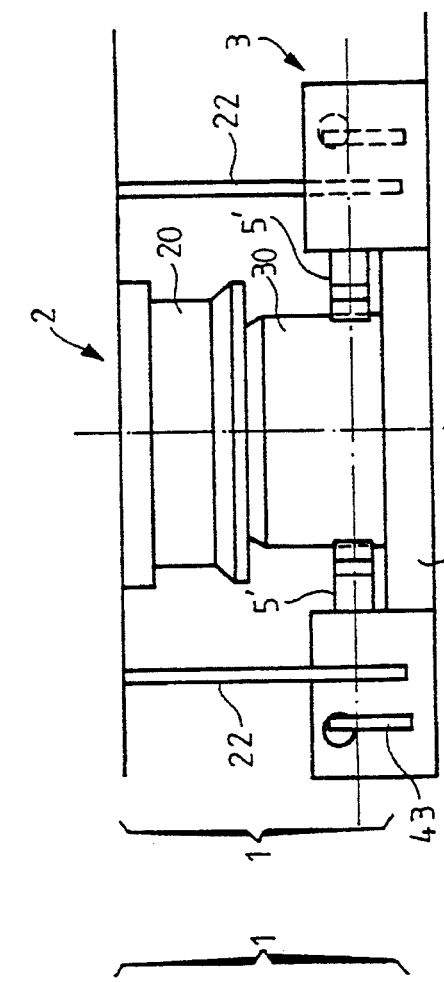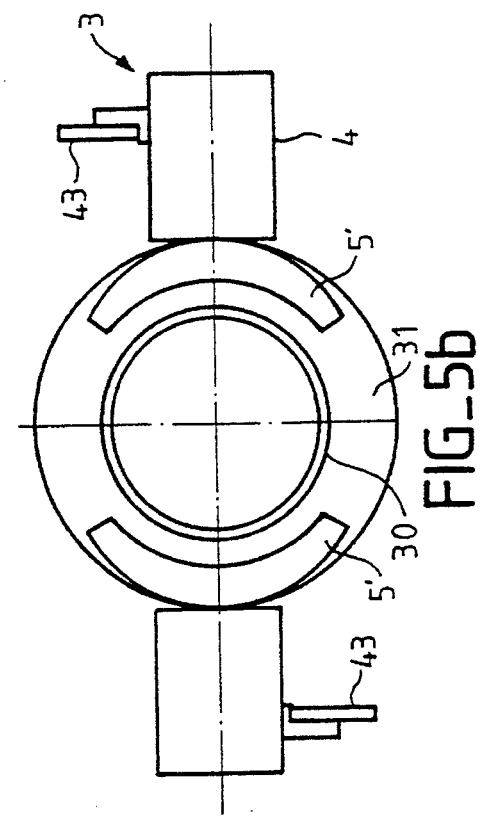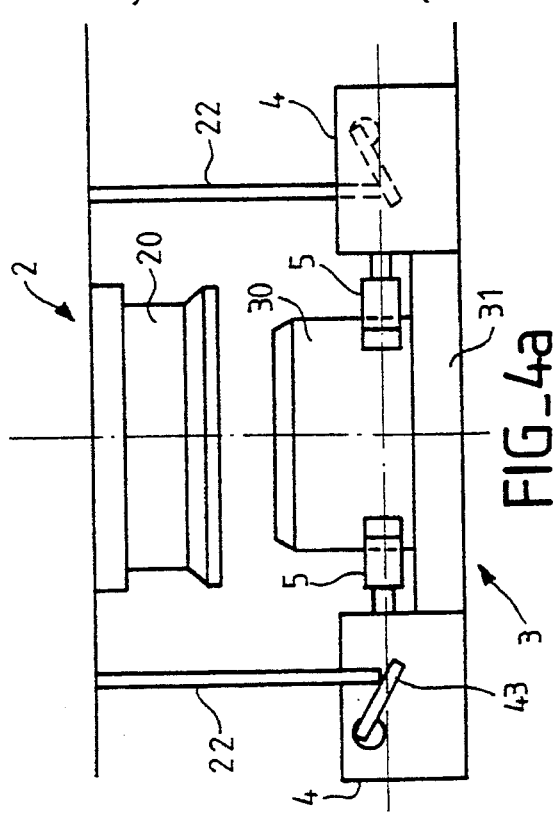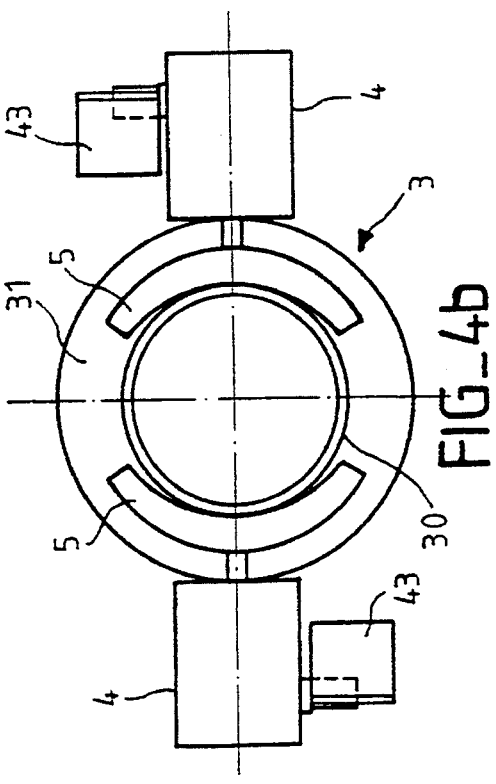
FIG._4a
FIG._4b
FIG._5a
FIG._5b

FLOATING CONNECTOR WITH TEMPORARY LOCKING FACILITY AND SPACE APPLICATION THEREOF

BACKGROUND OF THE INVENTION

1. Field of the Invention

The invention concerns a floating electrical or fluidic connector, and more particularly a connector intended for use in space and like applications.

2. Description of the Prior Art

In such applications, equipment is subjected to extreme environmental conditions. With particular reference to connectors, there are contradictory requirements: firstly, it is necessary to use floating connectors to allow for assembly tolerances, fluctuations in dimensions due to thermal expansion and variations in alignment on coupling; secondly, it is necessary to hold the device firmly during the launch phase in which it is exposed to levels of vibration typically in a range from 15 g to 30 g (approximately 150 m/s$^2$ to 300 m/s$^2$).

In the prior art, floating connectors usually comprise a socket floating relative to a fixed frame and relative to which it is centered by resilient return means. Springs are used for this purpose, for example.

The part of the complementary plug which connects to the socket includes a taper which guides the socket when inserted into it and which, in conjunction with the floating mount for the socket, enables re-alignment and effective connection of the fluidic or electrical systems of modules connected to the connector.

Floating connectors are described in the following two patent applications, for example:

DE-A1-3 903 839 (YAZAKI Corp.), and

EP-A1-0 371 835 (AUTOMOBILES PEUGEOT).

In space applications, because of the adverse conditions previously mentioned, there is a serious risk of destruction of the return system or even of the connector itself during launch.

An object of the present invention is a floating connector, for space applications in particular, which does not have the drawbacks of the prior art, some of which are outlined above.

To this end, said connector is provided with a device for temporarily locking the floating member, and this device is automatically disengaged on coupling.

In a preferred embodiment of the invention, this device has two stable states: a first state in which the temporary locking device is active and a second state in which this device releases the floating member.

In a further embodiment of the invention, the temporary locking device has means allowing it to be reset so that tests can be carried out prior to launch.

SUMMARY OF THE INVENTION

The invention consists in a floating connector comprising two parts adapted to be coupled together, namely, a first part comprising at least a floating base supporting at least a first connection member and a fixed second part comprising a second connection member for each first connection member paired therewith, a device for temporarily locking each floating base comprising means for locking the latter prior to coupling, and control means for the locking means having a first stable state or locked state of each base and a second stable state or unlocked state, wherein the second part comprises actuator means operating on the control means during coupling to release each base when coupling of the first and second parts is completed.

By virtue of these provisions, the invention achieves the stated objectives. The connector of the invention has many advantages, including the following:

a small overall size;

the unlocking system is entirely passive: energy is required only for coupling;

as the fixing device can be reset, tests can be carried out prior to launch;

the device is released automatically at the start of coupling;

it has two stable states: it follows that it remains in the released state after coupling.

The invention will be better understood and other features and advantages of the invention will emerge from the following description with reference to the appended drawings.

BRIEF DESCRIPTION OF THE DRAWINGS

FIGS. 1a, 1b and 1c show one embodiment of a floating connector provided with a temporary fixing device in accordance with the invention, respectively from the front, from the side and from the top.

FIGS. 2a and 2b show one embodiment of the temporary locking device in accordance with the invention respectively from the side and partly in section and from the top.

FIGS. 3a, 3b, 3c and 3d illustrate the operation of the temporary locking device during four successive phases of coupling a plug and a socket of a floating connector in accordance with the invention.

FIGS. 4a and 4b show the connector from the front and the socket of the connector from the top at the start of the coupling phase.

FIGS. 5a and 5b show the connector from the front and the socket of the connector from the top at the end of the coupling phase.

DETAILED DESCRIPTION OF THE PREFERRED EMBODIMENT

FIGS. 1a, 1b and 1c show one embodiment of a floating connector 1 in accordance with the invention seen from the front, from the side and from the top, respectively.

The connector 1 has two parts 2 and 3 adapted to be coupled together. The lower part (as shown in the drawings) includes a base 31 floating on a fixed support 6 by means of conventional spring means (not shown). This arrangement, conventional in the prior art, is well known to those skilled in the art and there is no need to describe it further. The base 31 supports a connection member 30. To simplify the following description, without this being in any way limiting on the scope of the invention, it is assumed that the connector is an electrical connector and that the connection member 30 is a plug.

The upper part (as shown in the drawings) includes a support 21 to which is attached a connection member 20, which is a socket in the example shown.

The connection members include respective conventional mutual guide means 200 and 300 which operate when one is inserted in the other for correct alignment with a common axis $A_1$.

In accordance with an important feature of the invention, the connector 1 is provided with a device 4-5 for temporarily holding the floating base 31. This device includes a pair of jaws 5 or similar members for immobilizing the base 31 and the connection member 30. For practical reasons, it is usually the connection member 30 which is held by the jaws 5. The latter are disposed on opposite sides of the connection member 30 and operate along an axis $A_2$ orthogonal to the axis $A_1$. The jaws 5 are operated by control means 4 to be described in detail with reference to FIGS. 2a and 2c.

FIGS. 1a through 1c show the connector 1 prior to coupling. In this condition the control means 4 cause the jaws 5 to lock the base 31-30. As explained below, the control means 4 include an unlocking member which, in the example shown, comprises a pedal 42 or like member. This member is accessible from the outside. The support 21 in the upper part 2 of the connector 1 includes rods 22 parallel to the axis $A_1$. These depress the pedals 42 on insertion and the pedals in turn act on the control means 4 to cause them to release the jaws 5.

FIG. 2a is a more detailed, partly sectioned side view of the device 4-5 for temporarily locking the floating base 30-31. It has a housing 40 in which a piston 41 slides along the axis $A_2$. To this end, two orifices 400 and 401 are provided in opposite walls of the housing. The housing 40 is fastened to the fixed support 6 (FIG. 1a) supporting the floating base (30-31). The piston 41 drives one of the two jaws 5. To be more precise, in the example shown, the piston 41 has three portions, namely, a first rod 410 inserted in the orifice 400 and whose cross-section allows it to slide in the latter, a second rod 411 inserted in the orifice 401 and whose cross-section allows it to slide in the latter, and a larger cross-section central portion 412. These three portions can be in the form of a single mechanical part. The central part has a central orifice 4120 large enough to receive a drive finger 42. The latter is attached to a shaft 44 which can rotate about an axis $A_3$ orthogonal to the axis $A_2$. The shaft 44 is rotated about the axis $A_3$ by a pedal 43 or like member normally exposed outside the housing 40. The lower part (as seen in FIG. 2a) of the central member 412 includes two notches or grooves 4121 and 4122 parallel to the axis $A_2$. A cam 45 is held by a first end of the housing 40, and its free end 450 has a profile complementary to that of the notches 4121 and 4122. The body of the cam 45 is a flexible blade member made from an elastic material.

Referring to FIG. 2a, the position of all the moving parts corresponds to the situation described up to now: the connector 1 is in the uncoupled state. The rods 22 fastened to the support 21 (FIGS. 1a and 1b) are raised and are not in mechanical contact with the pedals 43. These are shown substantially horizontal. The finger 42 is raised and does not apply any pressure to the cam 45. It is assumed that in the state described the jaws 5 immobilize the base 30-31, i.e. that they are pushed to the right (as shown in FIG. 2a) by the piston 41 and in particular by its end 411. The central part 412 abuts against the front wall of the housing 40. The free end or head 450 of the cam 45 is engaged in the notch 4121, the leftmost notch in the figure, and therefore locks the piston in the position shown, butted up against the front wall of the housing 40.

FIG. 2b is a top plan view of the temporary locking device 4-5 just described. Note in particular from this figure the shape of the jaw 5. The side 50 in contact with the connection member 30 must naturally mate as closely as possible with its exterior shape, to enhance the quality of locking. In most cases it is cylindrical. The jaw 5 is therefore advantageously semi-cylindrical in this case.

A knurled wheel 46 at the end of the shaft 44 is fixed to the latter by any appropriate means, such as screwing or welding. It is used to reset the temporary locking device 4-5, as explained further below.

FIGS. 3a through 3b illustrate the operation of the temporary locking device 4-5 by means of four successive states it assumes.

FIG. 3a shows the state in which the jaws 5 immobilize the connection member 30, i.e., that shown in FIG. 1b through 1c. In this state, the piston 41 is pushed to the right (in the example shown) and held against the front wall of the housing 40. To this end, the end 450 of the cam 45 is engaged in the notch 4121. The finger 42 is engaged in the central opening 4120 in the central area 412 of the piston 41, but does not displace the latter.

This state constitutes a first stable state of the temporary locking device 4-5.

During coupling of the connector, the rods 22 move towards the base as shown in FIG. 3b by the downward-pointing arrow. The bottom end of the rod 22 bears on the pedal 43 which rotates the shaft 44 about the axis $A_3$ and therefore displaces the finger 42, which begins to apply pressure to the rear wall 4123 of the central opening 4120 and to the body of the cam 45. The wall 4123 advantageously has a rounded profile. Trapped at one end in the rear wall of the housing 40, the cam 45, by virtue of its elasticity, curves downwards and its head begins to disengage from the notch 4121. The piston 41 begins to move to the left and the jaws 5 begin to release.

The rods 22 continue to move down as coupling proceeds. The pressure on the pedal 43 increases and the finger 42 continues to move the piston 41 towards the left. The end 450 of the cam disengages entirely from the notch 4122.

Finally, when coupling of the two parts of the connector 1 is about to be completed, as shown in FIG. 3d, the piston 41 is pushed towards the rear wall of the housing 40. Again by virtue of its elasticity, the body of the cam 45 pushes the finger towards the rear and the head 450 is engaged in the second notch 4122. Accordingly, the piston 41 is held in the new position, in which the jaws 5 are released.

This state constitutes a second stable state of the temporary locking device 4-5.

It will be readily understood from the foregoing description that the only energy input required by the temporary locking device 4-5 equipping the floating connector 1 in accordance with the invention is supplied by conventional coupling actuation means (not shown). The device is therefore entirely passive.

Referring again to FIG. 2a, it is entirely reversible and it can be tested in a non-destructive manner to see that it is operating correctly before the operational launch phase. It is only necessary to operate the knurled wheel 46 to move the finger 42 in the required direction to change from the second stable state to the first or vice versa, an extremely simple operation.

As already mentioned, FIGS. 1a through 1c show the first stable state or locked state of the jaws 5.

For a more comprehensive illustration of how the floating connector 1 of the invention operates, FIGS. 4a, 4b, 5a and 5b will now be described.

FIGS. 4a and 4b show the floating connector 1 respectively from the side and from the top during an intermediate phase of coupling the two parts 2 and 3 of the connector. FIG. 4a shows more particularly the action of the rods 22 on the pedals 43 which, in the intermediate state shown in the figure, begin to push the latter down. The jaws 5 begin to open and release the connection member 30. This state corresponds to that shown in FIGS. 3*b* and 3*c* for the temporary locking device 4-5.

FIGS. 5*a* and 5*b* show the floating connector 1, respectively from the side and from the top, on completion of coupling of the two parts of the connector 1. FIG. 5*a* shows more particularly the position reached by the rods 22 and the pedals 43. The latter are totally depressed. The jaws 5 are open and the connection member 30 has been released, i.e., is floating. This state corresponds to that shown in FIG. 3*d* for the temporary locking device 4-5.

It should be clear that the invention applies equally to electrical and fluidic connectors.

Although particularly well suited to space applications, the invention is not restricted to this type of application. It applies to any floating connector where it is necessary to provide temporary locking before coupling of the two parts constituting the connector.

Finally, it is implicitly assumed in the description that there is only one pair of male and female connection members. In one embodiment of floating connector in accordance with the invention, a plurality of connection members is provided. A temporary locking device similar to that previously described can then be associated with each floating connection member or a single locking device can operate one pair of jaws gripping all the connection members. All that is required in this case is for the wall of each jaw facing the connection members to be locked to have an appropriate profile mating with the external sections of the connection members. In most cases this wall will have semicircular cavities which fit around the connection members.

What is claimed:

1. Floating connector comprising two parts adapted to be coupled together, namely, a first part comprising at least a floating base supporting at least a first connection member and a fixed second part comprising a second connection member for each first connection member paired therewith, a device for temporarily locking each floating base comprising means for locking said base prior to coupling, and control means for said locking means having a first locked state of each base and a second unlocked state, wherein said second part comprises actuator means operating on said control means during coupling to release each base when coupling of said first and second parts is completed.

2. Floating connector according to claim 1, wherein said locking means comprise a pair of jaws which in said locked state grip at least one said connection member supported by said floating base, and wherein control means are provided in association with each jaw, said control means each comprising a piston displacing said jaw between a first position in which said jaw grips one of said connection members and a second position in which said jaw releases said connection member, and a member driving said piston, wherein said actuator means comprise rods acting on said piston drive member in order to displace said piston drive member between said first and second positions.

3. Floating connector according to claim 2, wherein said control means each comprise a housing in which said piston slides in a first direction, said piston comprises first and second notches, said control means further comprise a cam in the form of a flexible blade member one end of which is fixed to said housing and the other end of which has a head with a profile complementary to that of said notches so that said head engages in a first notch when said piston is in said first position and holds said piston in said first position and so that said head engages in a second notch when said piston is in said second position and holds said piston in said second position, and said piston drive member also acts on said cam to disengage said head from said first notch when said piston is moved from said first position to said second position, said first and second positions defining said first and second stable states.

4. Floating connector according to claim 3, wherein said piston comprises a central area with an orifice and said piston drive member comprises a pedal operated by said rods constituting said actuator means and rotating a shaft about an axis orthogonal to said first direction, in turn driving an elongate member inserted in said orifice in said central region, said elongate member applying pressure to one wall of said orifice and moving said flexible blade member constituting said cam away from said piston when said pedal is operated by said rods during coupling of said first and second parts of said connector in order to move said piston from said first to said second position.

5. Floating connector according to claim 1, wherein said temporary locking device further comprises manual resetting means for switching said temporary locking device from one of said stable states to the other of said stable states.

6. Floating connector according to claim 4, wherein said temporary locking device further comprises manual resetting means for switching said temporary locking device from one of said stable states to the other of said stable states and said resetting means comprise a knurled wheel operating on said shaft to rotate said shaft and drive said elongate member.

7. Floating connector according to claim 1, wherein said connector is of the electrical type.

8. Floating connector according to claim 1, wherein said connector is of the fluidic type.

* * * * *